(12) United States Patent
Ruste et al.

(10) Patent No.: US 7,985,034 B2
(45) Date of Patent: Jul. 26, 2011

(54) BALL JOINT AND BEARING SHELL

(75) Inventors: Trygve Ruste, Raufoss (NO); Stig Fredrik Mathiesen, Raufoss (NO)

(73) Assignee: Raufoss Technology AS (NO)

( * ) Notice: Subject to any disclaimer, the term of this patent is extended or adjusted under 35 U.S.C. 154(b) by 199 days.

(21) Appl. No.: 10/589,036

(22) PCT Filed: Feb. 14, 2005

(86) PCT No.: PCT/NO2005/000053
§ 371 (c)(1),
(2), (4) Date: May 8, 2007

(87) PCT Pub. No.: WO2005/078290
PCT Pub. Date: Aug. 25, 2005

(65) Prior Publication Data
US 2008/0019765 A1    Jan. 24, 2008

(30) Foreign Application Priority Data

Feb. 12, 2004 (NO) .................................. 20043247

(51) Int. Cl.
*F16C 11/06* (2006.01)
(52) U.S. Cl. .......................... 403/133; 403/135; 403/141
(58) Field of Classification Search .................. 403/132, 403/133, 135, 141, 365, 371, 56, 76, 77; 384/203, 206, 213, 301; 464/78
See application file for complete search history.

(56) References Cited

U.S. PATENT DOCUMENTS

| | | | | |
|---|---|---|---|---|
| 657,712 | A * | 9/1900 | Thomas | 403/371 |
| 3,041,094 | A * | 6/1962 | Herbenar | 403/133 |
| 4,318,627 | A | 3/1982 | Morin | |
| 4,372,621 | A | 2/1983 | Farrant | |
| 4,591,276 | A * | 5/1986 | Schneider et al. | 384/206 |
| 4,904,106 | A * | 2/1990 | Love | 403/135 |
| 5,704,727 | A * | 1/1998 | Atkins et al. | 403/135 |
| 5,772,337 | A * | 6/1998 | Maughan et al. | 403/137 |
| 5,782,573 | A | 7/1998 | Dorr et al. | |
| 6,076,840 | A * | 6/2000 | Kincaid et al. | 403/122 |
| 6,082,923 | A | 7/2000 | Maughan | |
| 6,164,829 | A * | 12/2000 | Wenzel et al. | 403/135 |
| 6,579,025 | B1 * | 6/2003 | Sokolihs et al. | 403/44 |
| 6,604,887 | B2 * | 8/2003 | Carreira | 403/371 |

FOREIGN PATENT DOCUMENTS

| | | |
|---|---|---|
| EP | 0350678 B1 | 1/1990 |
| GB | 1233906 A | 6/1971 |
| WO | WO9932796 A1 | 7/1999 |

* cited by examiner

*Primary Examiner* — Michael P Ferguson
(74) *Attorney, Agent, or Firm* — Seyfarth Shaw LLP

(57) ABSTRACT

A ball joint for a wheel suspension in a vehicle is disclosed. The ball joint includes a bearing shell, a ball, and a housing. The ball is supported in the bearing shell, with the shell being subdivided by slots into lip elements. The slots are preferably arranged in the bearing shell from a middle part and up to an upper rim. The lip elements may be bent outwards at a compression groove to admit the ball when it is introduced into the shell.

10 Claims, 3 Drawing Sheets

PRIOR ART

Closure   "Folding"

PRIOR ART

Main Loading Area

BALL JOINT AND BEARING SHELL

FIELD OF THE INVENTION

The present invention relates to a ball and socket joint for wheel suspension units in vehicles.

TECHNICAL BACKGROUND

Ball joints utilised in the steering gear and wheel suspension in cars normally comprise a shell and a ball mounted in this. The function of the shell is as a bearing in the joint and to distribute the lubricant onto the surface of the ball. This is particularly important when the ball lacks other corrosion inhibiting measures. The shell shall also enable preloading of the ball to prevent slip in the connection. In order to mount the ball in a single piece shell, it is necessary to allow the opening at the open end of the shell to be expanded to the same size as the diameter of the ball. Normally this is achieved by splitting this end with 6-8 slots down to the centre of the shell forming lip elements, and there providing a thinning of the shell to enable the lips to be turned outwards, se FIGS. 1 and 2.

The disadvantage of this prior art solution is that all measures mentioned above contribute to reduce the active load bearing area of the shell and thus reduce the load carrying potential at a given diameter. Due to room restrictions it is often necessary to use a ball as small as possible in the joint, which is contradictory of the design of the shells.

SHORT SUMMARY OF THE INVENTION

Thus, it is an object of the present invention to provide a shell for systems in which the primary load is in a mainly horizontal direction (75-100° on the ball stud); the shell providing an efficient distribution of lubricant over the ball; the shell being made in a single piece; being of a smaller size and having increased load carrying capacity compared with prior art shells.

This is achieved in a shell as defined in the independent claim. Advantageous embodiments of the shell appear from the dependent claims.

SHORT DESCRIPTION OF THE DRAWINGS

In the following, the invention will be described in detail in reference to the appended drawings, in which.

DETAILED DESCRIPTION OF THE INVENTION

Figure 1:
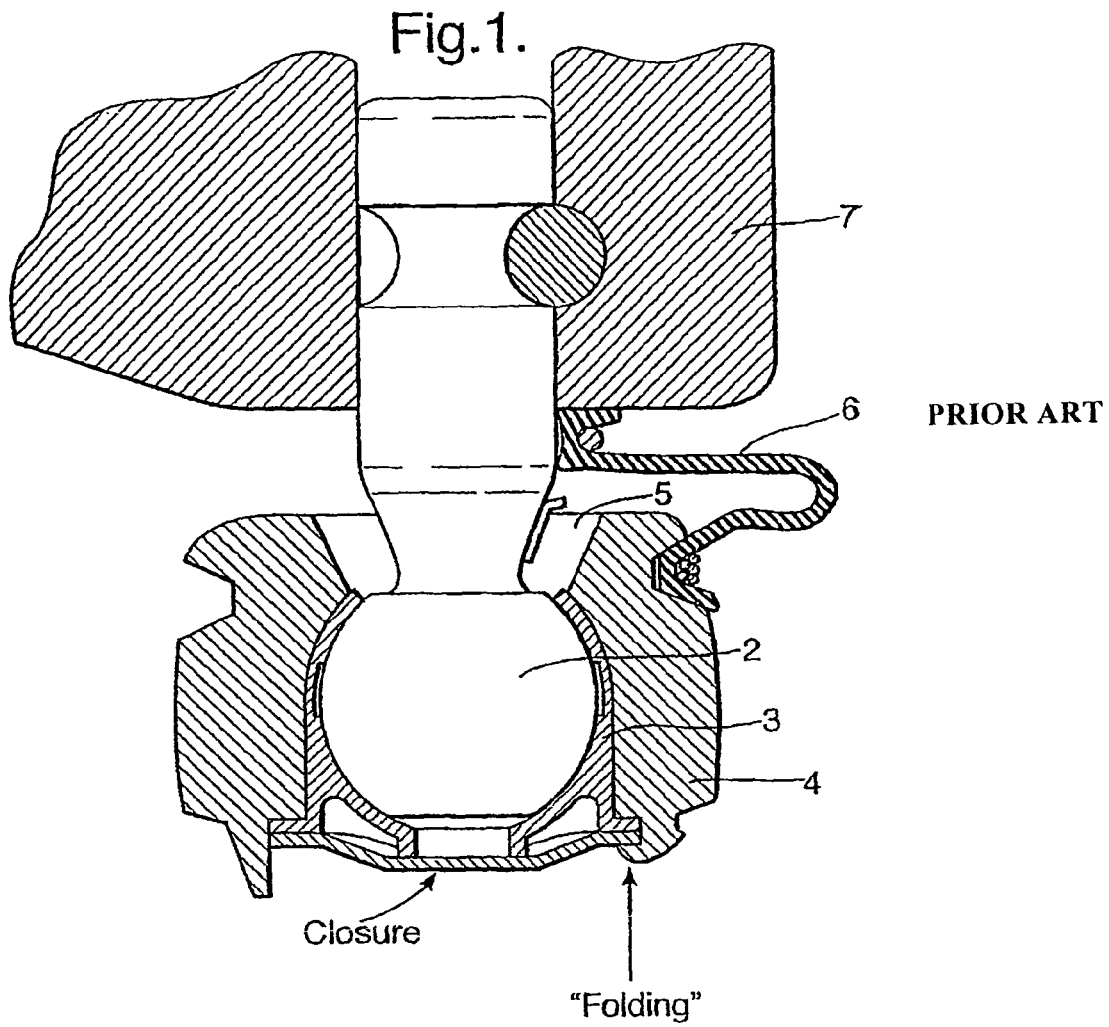
FIG. 1 shows a section though a prior art ball joint.
Figure 2:
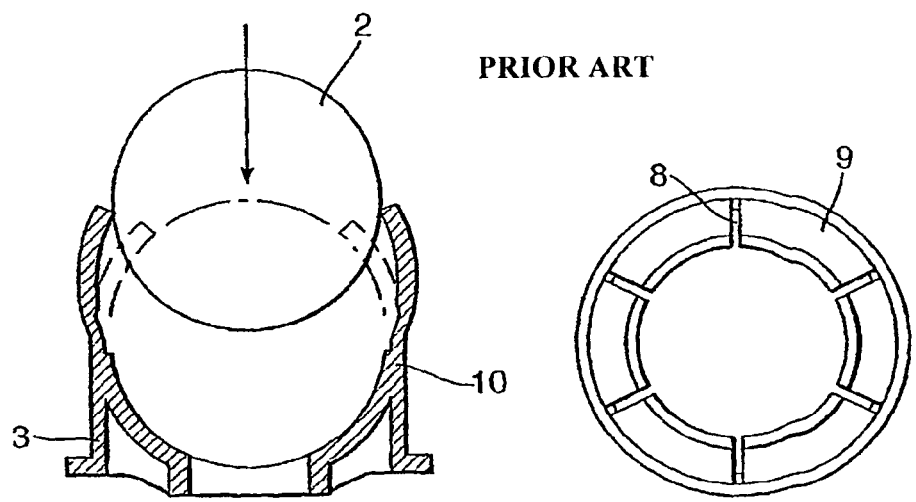
FIG. 2 shows a detail of a prior art ball joint which illustrates how a ball is mounted in a shell.

FIG. 1 shows a prior art ball joint (1). The ball joint comprises a ball (2) arranged in a control arm (4) by being in mesh with a cavity with an associated shell (3). The ball joint (1) further provides a connection between the control arm (4) and a wheel housing (7). The cavity with the ball and shell is protected with rubber bellows for preventing the intrusion of extraneous matter and dirt impairing the freedom of movement. The ball joint is lubricated with grease (5) or another lubricant which is distributed around the ball by 6-8 slots (8) in the shell (3). The slots (8) have another function in addition to the distribution of lubricant (5). The slots subdivide the shells in lip elements (9) enabling the shell to be opened to admit the ball (2) as shown in FIG. 2. The expansion of the opening is made possible by the lip elements being tapered at the centre of the shell in a compression groove (10) providing weakened areas allowing the lip elements 9 to be bent outwards.

Figure 3:
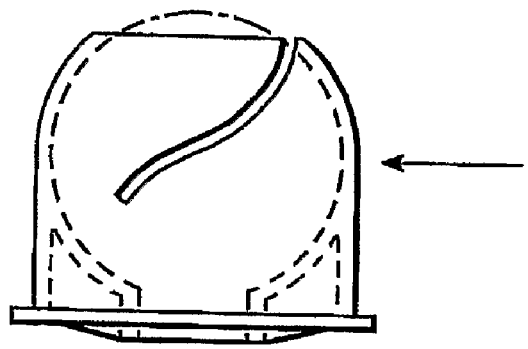
FIG. 3 shows the shell of the invention, in sectional and top views.
Figure 3:
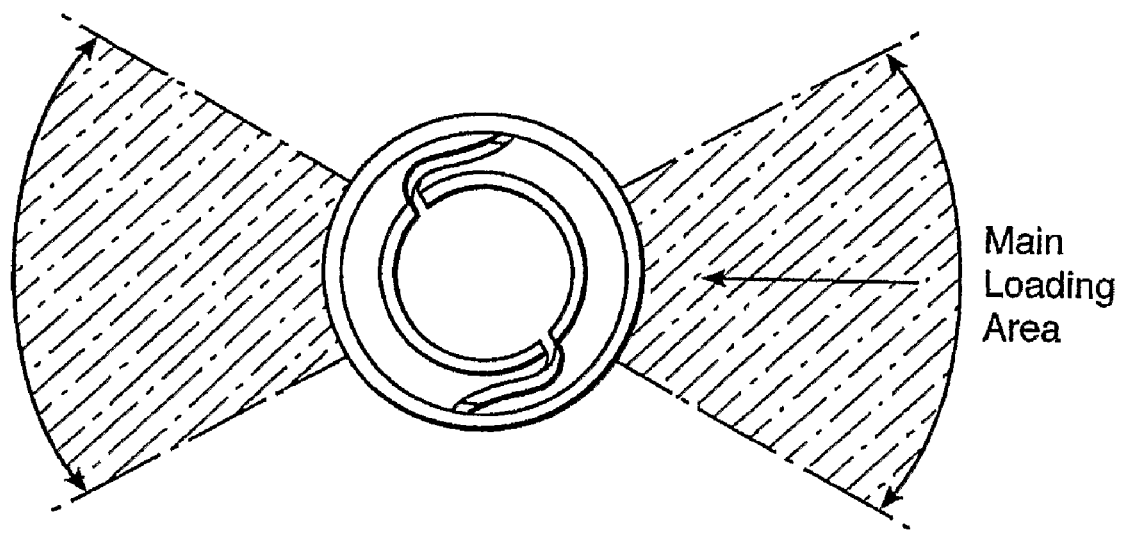

The inventive shell has the same function as the prior art shell shown in FIGS. 1 and 2, but it is designed to increase the load carrying capacity of the ball joint (1) by a given diameter. According to the invention, two slots (8) are provided in the shell. In order for the slots to provide a good lubricating action, they are designed as arched incisions or spiral slots on opposite sides of the shell, extending mainly diagonally around the shell from the opening to beneath the centre of the shell. Accordingly, the slots are arranged 180° from each other, and 90° on the main loading direction, as shown in FIG. 3.

Figure 4:
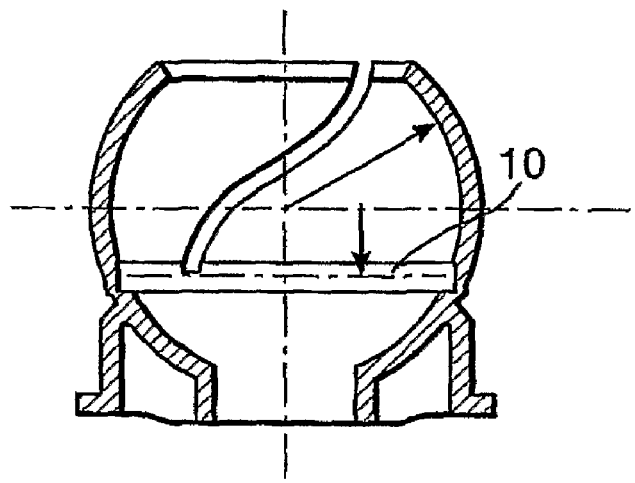
FIG. 4 shows a detail of the inventive shell.

Due to the arrangement of the slots, the compression groove (10) is relocated from the centre, which is the most loaded area, with about 3.5 mm, as shown in FIG. 4

Figure 5:
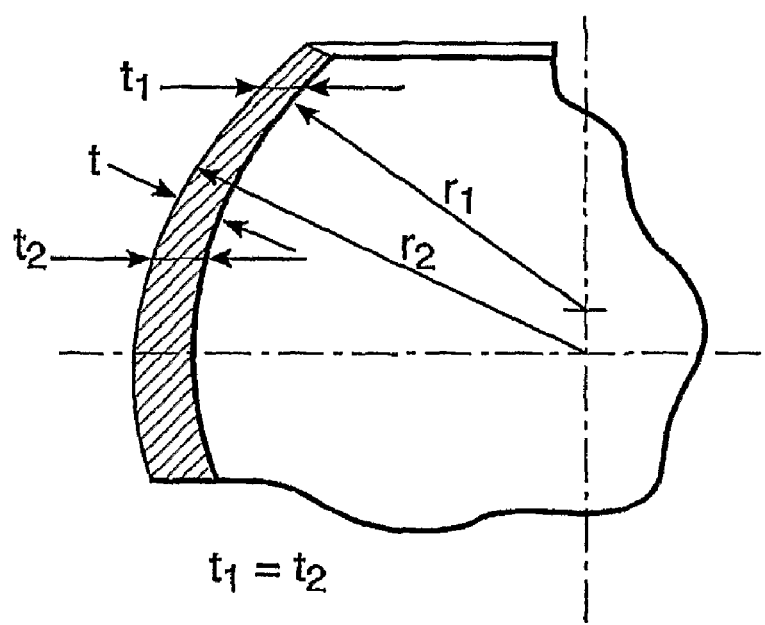
FIG. 5 shows a detail of the inventive shell.

In addition, the shell is designed in a new way. The wall of the shell has decreasing thickness from the centre towards the opening of the shell so that the horizontally projected thickness (t1, t2) is constant in size up to the rim of the shell (see FIG. 5). This means that the effective thickness (t) is decreasing. This design provides a specific pressure in the active surface which is as homogeneous as possible, and thus the shell (2) may stand a larger load.

The characterizing features mentioned above will significantly improve the load carrying capacity of the shell at a given diameter of the ball, or when room restrictions dictates, to decrease its dimensions.

The invention claimed is:

1. A ball joint for a wheel suspension in a vehicle, the ball joint comprising:
    a housing having a cavity formed therein;
    a ball pin having a ball head and a ball pin shaft;
    a bearing shell having an outer surface received within the cavity of the housing and a cavity defining an inner bearing surface rotatably receiving the ball head and an opening within an end opening face of the shell through which the ball pin shaft extends, the bearing shell being divided into a plurality of lip elements by a plurality of circumferentially spaced spiral slots axially extending from an annular compression groove disposed in an axial middle part of the shell and through the end opening face of the shell, the spiral slots each radially extending completely through the shell between the inner bearing surface and the outer surface the shell;
    wherein the lip elements are configured to be bent outward via the compression groove to receive the ball head in the inner bearing surface of the bearing shell and to apply a compressive force against the ball head when received therein; and
    wherein each of the plurality of spiral slots is arranged to extend diagonally around part of the shell to distribute lubricant to the ball head and to enable the lip elements to annularly twist outward as the lip elements are bent radially outward to expand the opening to the size of the ball head while maximizing the load bearing area of the shell.

2. A ball joint as claimed in claim 1, wherein the bearing shell includes two slots, the slots being arranged 180° from each other and 90° from a direction of main loading.

3. A ball joint as claimed in claim 1, wherein the compression groove is disposed beneath the center of the shell.

4. A ball joint as claimed in claim 1, wherein the housing is an integrated part of a control arm.

5. A ball joint as claimed in claim 1, wherein a wall thickness of the shell continuously decreases from an axial center of the shell to the end opening face such that a horizontally projected thickness of the wall is constant and the relative thickness decreases.

6. A ball joint for a wheel suspension in a vehicle, the ball joint comprising:

a housing having a cavity formed therein;

a ball pin having a ball head and a ball pin shaft;

a bearing shell having an outer surface received within the cavity of the housing and a cavity defining an inner bearing surface rotatably receiving the ball head and an opening within an end opening face of the shell through which the ball pin shaft extends, the bearing shell being divided into a plurality of lip elements by a plurality of circumferentially spaced arched incision slots axially extending from an annular compression groove disposed in an axial middle part of the shell and through the end opening face of the shell, the arched incision slots each radially extending completely through the shell between the inner bearing surface and the outer surface the shell;

wherein the lip elements are configured to be bent outward via the compression groove to receive the ball head in the inner bearing surface of the bearing shell and to apply a compressive force against the ball head when received therein; and wherein each of the plurality of arched incision slots is arranged to extend diagonally around part of the shell to distribute lubricant to the ball head and to enable the lip elements to annularly twist outward as the lip elements are bent radially outward to expand the opening to the size of the ball head while maximizing the load bearing area of the shell.

7. A ball joint as claimed in claim 6, wherein the bearing shell includes two slots, the slots being arranged 180° from each other and 90° from a direction of main loading.

8. A ball joint as claimed in claim 6, wherein the compression groove is disposed beneath the center of the shell.

9. A ball joint as claimed in claim 6, wherein the housing is an integrated part of a control arm.

10. A ball joint as claimed in claim 6, wherein a wall thickness of the shell continuously decreases from an axial center of the shell to the end opening face such that a horizontally projected thickness of the wall is constant and the relative thickness decreases.

* * * * *